United States Patent [19]

Milliken

[11] 4,212,080
[45] Jul. 8, 1980

[54] DATA TRANSMISSION CONTROL SYSTEM
[76] Inventor: Walter C. Milliken, 8 Evans Dr., Dover, N.H. 03820
[21] Appl. No.: 912,871
[22] Filed: Jun. 5, 1978
[51] Int. Cl.² ............................ G06F 3/04; H04Q 9/00
[52] U.S. Cl. ............................ 364/900; 340/147 LP; 340/152 R
[58] Field of Search .............. 179/15 AL; 340/147 R, 340/147 LP, 147 SY, 151, 152 R; 364/200 MS File, 900 MS File

[56] References Cited

U.S. PATENT DOCUMENTS

| | | | |
|---|---|---|---|
| 3,480,914 | 11/1969 | Schlaeppi | 364/200 |
| 3,806,885 | 4/1974 | Moore | 364/200 |
| 3,996,561 | 12/1976 | Kowal | 364/200 |
| 4,016,369 | 4/1977 | Pedersen | 179/15 AL |
| 4,030,075 | 6/1977 | Barlow | 364/200 |
| 4,032,893 | 6/1977 | Moran | 179/15 AL |

*Primary Examiner*—James D. Thomas
*Attorney, Agent, or Firm*—Darby & Darby

[57] ABSTRACT

A system for transferring data between a plurality of devices is disclosed. Each of the devices is connected to a communication bus by a corresponding control unit. The communication bus comprises a data signal path and a control signal path. Each control unit may transmit data to all of the other control units upon reception of a control signal which is generated by that control unit which is positioned at a "head-end" of the bus. The control signal also serves to indicate the direction of travel of data signals on the data signal path.

10 Claims, 4 Drawing Figures

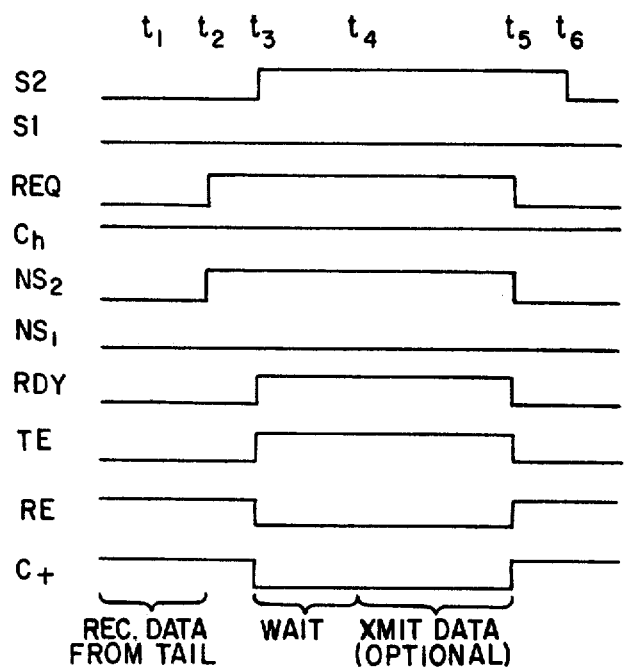
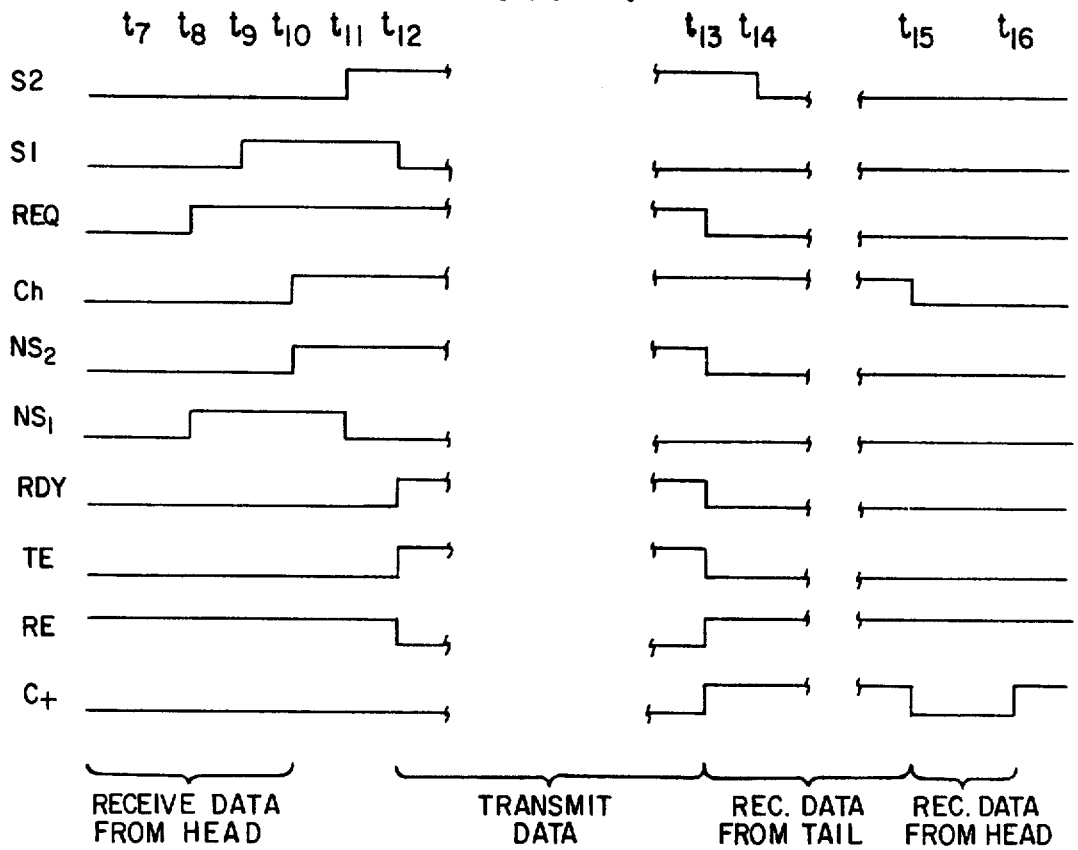

under this invention.

DATA TRANSMISSION CONTROL SYSTEM

BACKGROUND OF THE INVENTION

1. Field of Invention

This invention generally relates to data processing and transmission systems and more specifically to the interconnection of a plurality of devices or units by means of a common bus.

2. Discussion of Prior Art

It is known that a plurality of units or devices of a data processing system or data communication system may be connected to a single interconnecting bus over which all data transfers take place. Typical of such a system is the one described by U.S. Pat. Nos. 3,710,324 and 3,815,099 of Cohen et al.

It is typical of these systems that one of the devices, such as a processing unit, remains primarily in control of the operations taking place on the bus. Other devices may temporarily gain control of the bus for the limited time necessary to complete their data transfers, but they may obtain this control only by requesting it from the primary controlling device and having that request granted.

The above arrangement suffers from several disadvantages. Data transfers between devices on the bus depend upon the transmitting device having its request to obtain control of the bus granted by the primary controlling device. Thus, if the primary controlling device is busy or otherwise unable to grant the request, transmissions of data between other devices on the bus are delayed.

Another disadvantage of this arrangement is that the throughput of the primary controlling device is limited by the amount of time this device must spend in controlling data transfer between other devices. The maximum data handling capacity of this type of arrangement is also limited by the overhead introduced by the necessary communication of control information between the primary controlling device and the other devices of the system. Furthermore, a malfunction in the primary controlling device can effectively bring all data transmissions along the bus to a halt, even if the other devices on the bus remain in operating condition.

A further characteristic of some prior art systems is a requirement for a set of control lines to and from each separate device on the bus or the primary controlling device or both. Minimally, this set of control lines comprises a set of device address lines common to all devices. Each device must include means for recognizing the signals upon these lines and taking actions responsive to the signals. Minimizing the number of control lines would decrease the amount of hardware in the system which consequently would reduce its cost and increase its reliability. Furthermore, reduction of the number of control functions would reduce the overhead time necessary for system control and make this time available for transferring data, thereby increasing the maximum throughput of the system.

It is an object of this invention, therefore, to provide a data transmission control system in which data may be transferred between a plurality of devices without the requirement for one of these devices to remain primarily in control of the system.

It is another object of this invention to provide a data transmission control system for transmitting data between a plurality of devices in which the number of control lines interconnecting these devices is minimized.

It is yet another object of this invention to provide a data transmission control system for transmitting data between a plurality of computer-like devices in which the number of control functions which must be performed by each of these devices is minimized.

SUMMARY

In accordance, with a preferred embodiment of the present invention, a set of devices are arranged along a single interconnecting communications bus over which all data transfers take place. Each device is connected to the communications bus by means of a corresponding control unit, all of these control units being comprised of identical circuitry.

The communications bus is comprised of two signal paths: a bidirectional data transmission path; and a control path for carrying a control signal which enables the control units to transmit data and indicates the direction in which data is being transmitted on the data path. The data signal path may be adapted to carry one or more data signals.

The control signal is generated by the one of the control units connected to an end portion of the bus defined as the "head end" and is propagated toward the other or "tail end" of the bus by the ones of the control units which are associated with devices which do not wish to transmit data. When the control signal reaches a control unit associated with a device which wishes to transmit data, that control unit prevents further propagation of the control signal and begins to transmit data signals in both directions on the data transmission path. When data transmission is completed, the control unit propagates the control signal and operations proceed as previously described.

Because of the above-described method of propagating the control signal, those control units which are closer to the head end of the communications bus than the transmitting control unit receive the active state of the control signal. This active control signal serves to activate these control units to receive data signals traveling in a tail-to-head direction on the data transmission path. On the other hand, control units which are closer to the tail end of the communications bus than the transmitting control unit receive the inactive state of the control signal which activates them to receive data traveling in a head-to-tail direction.

In a preferred embodiment of the invention each control unit includes: a group of data receivers and selectable transmitters for receiving and propagating data signals on the data transmission path; a control signal receiver and selectable transmitter for receiving and propagating the control signal on the control path; and a controller which communicates with the control path and the corresponding computer like device and controls the selection of the above mentioned transmitters. The controller is preferably a commercially available PROM which has "burned into" it a unique data pattern which corresponds to the logical equations of the present invention. The controller, in accordance with these logical equations selects the appropriate ones of the above mentioned transmitters in response to the control signal and the signals which are received from the corresponding computer-like device via an interface signal bus.

This invention is pointed out with particularity in appended claims. An understanding of the above and further objects and advantages of this invention may be obtained by referring to the following description taken in conjunction with the drawings.

BRIEF DESCRIPTION OF THE DRAWINGS

FIG. 3 is a timing chart showing a sequence of operations in the control unit at the head end of the communications bus; and FIG. 4 is a timing chart showing a sequence of operations in a control unit not at the head end of the communications bus.

DESCRIPTION OF AN ILLUSTRATIVE EMBODIMENT

Figure 1:
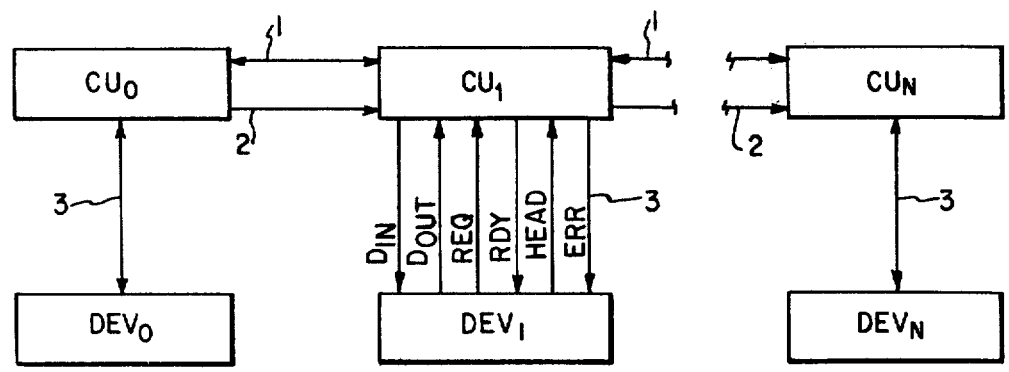
FIG. 1 is a block diagram of a data transmission system adapted to implement this invention.

Referring to FIG. 1, there is shown a block diagram of a data transmission control system embodying the present invention. The system includes a plurality of devices $DEV_0$ through $DEV_N$. Each device is required to include means for implementing any one of the numerous communications protocols which are known in the art. The details of these protocols are, however, beyond the scope of the present disclosure, and the present invention will work equally well regardless of the particular protocol selected.

Each one of $DEV_0$ through $DEV_N$ is operatively connected to a corresponding one of a plurality of control units $CU_0$ through $CU_N$. Communications between each device and its corresponding control unit takes place over an interface signal bus 3. The control units are arranged so as to be serially connected by segments of a single communications bus, this bus comprising a data signal path 1 and a control signal path 2. In the present embodiment, data signal path 1 is a bidirectional half duplex channel comprising an electrical signal line for carrying digitally encoded electrical signals. Control signal path 2 is a unidirectional channel also comprising an electrical line for carrying digitally encoded electrical signals. These signal paths could be implemented by other means such as twisted wire pairs, or fiber-optical cable. It will also be appreciated that the present invention is equally applicable to any method of encoding signals on these paths such as the above-mentioned digitally encoded electrical signals, analogue electrical signals, tone signals, light pulses, or the like. Data signal path 1 may be a full duplex or a unidirectional channel.

For the sake of simplicity, the individual signal paths comprising the interface signal busses 3 which connect each device to its corresponding control unit are shown in detail only for the connection between $DEV_1$ and $CU_1$. However, the connections between all of the devices and their corresponding control units are identical. These signal paths are as follows.

A $D_{IN}$ signal path transfers data received by the control unit via data signal path 1 to the corresponding device. This path is always enabled.

A REQ signal path carries a request (REQ) signal from the device to the control unit which indicates that the device wishes to transmit data. When the control unit is ready to transmit this data to data signal path 1, it activates a ready (RDY) signal which is presented to the device via a RDY signal path. The device then commences to transmit data to the control unit via a $D_{OUT}$ signal path. The device signals the end of the data transmition by deactivating the REQ signal.

A HEAD signal path conveys a HEAD signal which may be activated by the device to cause its associated control unit to act as the head-end control unit of the communications bus. Under normal conditions, $DEV_0$ would activate this head signal to $CU_0$ and all other devices would maintain the signal in its inactive state. $CU_0$ would thus be the head-end control unit on the bus; the point on the bus to which $CU_0$ is attached being defined as the head-end of the communications bus. $CU_N$ would be the tail-end control unit on the communications bus; the point on the bus to which $CU_N$ is attached being defined as the tail-end of the bus. Under certain conditions, however, such as a failure of $CU_0$, it may be desirable to redefine the one of the control units which serves as the head-end control unit. It is a feature of the present invention, therefore, that any device may activate the HEAD signal to its corresponding control unit and thereby cause that control unit to serve as the head-end control unit of the communications bus. Similarly, if an intermediate control unit such as $CU_6$ failed, the control unit next closest to the tail-end of the bus (here $CU_7$) could be actuated to serve as the head-end control unit for a segment of the bus. In such an arrangement, $DEV_0$ through $DEV_5$ could continue to communicate with each other on one segment of the original bus while $DEV_7$ through $DEV_N$ communicated with each other on a second segment of the bus. For the remainder of this discussion, however, it will be assumed that $CU_0$ is the head-end control unit.

The following operational examples will be useful for gaining an understanding of the data transmission control system of the present invention. Assuming an idle state of the system wherein all previously initiated data transfers have been completed, there are no active signals on the interface signal bus 3 between $CU_0$ and $DEV_0$ except for the HEAD signal which is held in its active state by $DEV_0$. Under these conditions $CU_0$ holds the control signal on control signal path 2 in its active state. This control signal is propagated through $CU_1$ and any other control units lying between the head-end and the tail-end of the communications bus, until it reaches the tail-end control unit $CU_N$. The active state of the control signal conditions each of the control units $CU_1$ through $CU_N$ to receive and propagate data signals travelling over data signal path 1 in a tail-to-head direction.

$DEV_0$ initiates a cycle of operations on the bus by activating the REQ signal to $CU_0$. $CU_0$ responds to the activation of the REQ signal by deactivating the control signal and activating the RDY signal to $DEV_0$. The inactive state of the control signal is propagated through the other control units on the bus and conditions them to receive and propagate data travelling in a head-to-tail direction over data signal path 1. If $DEV_0$ has data to transmit at this time it responds to the activation of the RDY signal by commencing to transmit data to $CU_0$ over the $D_{OUT}$ signal path and $CU_0$, in turn, transmits this data to the other control units via data signal path 1. $DEV_0$ holds the REQ signal in its active state until the end of the data transmission, at which time the REQ signal is deactivated. If, on the other hand, $DEV_0$ has no data to transmit, it holds the REQ signal in its active state for a short period of time following reception of the RDY signal, and then deactivates it. The deactivation of the REQ signal causes $CU_0$ to deactivate the RDY signal and to activate the control signal which is conveyed to $CU_1$ via control signal path 2.

If, at this time, $DEV_1$ has no data to transmit it holds the REQ signal on the REQ signal path between $DEV_1$ and $CU_1$ in its inactive state. Under these conditions, the reception of the active control signal by $CU_1$ conditions $CU_1$ to receive data travelling in a tail-to-head direction over data signal path 1. In this case, $CU_1$ propagates the active control signal to the next control unit on the bus via control signal path 2.

If, previous to the reception of the active control signal by $CU_1$, $DEV_1$ had data to transmit, it would have activated the REQ signal to $CU_1$. In this case, $CU_1$ does not propagate the active control signal when received, but instead responds to the reception of the active control signal by activating the RDY signal to $DEV_1$. Upon reception of this RDY signal, $DEV_1$ begins to transmit data to $CU_1$ via the corresponding $D_{OUT}$ signal path. $CU_1$, in turn, transmits this data toward both the head-end and tail-end of the bus via data signal path 1. It will be noted that, in general, control units which are positioned closer to the head-end of the bus than a transmitting conrol unit such as $CU_1$ would have already received the active control signal and are thus conditioned to receive data travelling in a tail-to-head direction on data signal path 1. Since the transmitting control unit does not propagate the active control signal, control units closer to the tail-end of the bus than the transmitting control unit are conditioned by the inactive state of the control signal to receive data travelling in a head-to-tail direction on data signal path 1. Thus, all of the control units on the bus are always conditioned to receive data from the currently transmitting control unit.

The above-described operations continue until the active state of the control signal is propagated to the tail-end control unit ($CU_N$). Upon completion of the tail-end control unit's data transmission (if any), the current cycle of operations is completed and $DEV_0$ may initiate a new cycle by again activating the REQ signal.

Several means are possible for enabling the head-end control unit and its corresponding computer-like device to detect the end of a cycle of operations. For example, control signal path 2 may be looped around from the tail end control unit to the head end control unit; the reception by the head end control unit of the active control signal as propagated by the tail-end control unit indicating the completion of the cycle. Alternatively, the tail-end control unit may include means for generating a special code for transmission to the head-end control unit via data signal path 1 upon the completion of the cycle. In this case, the head-end control unit or its corresponding computer-like device or both would include means for recognizing this special code. As a third alternative, the head-end control unit or its corresponding computer-like device or both could include means for detecting the lack of any data transmission over data signal path 1 during a time-out period which in the present embodiment would be approximately two milliseconds plus two times the signal propagation delay from the head-end to the tail-end of the bus; the expiration of the time-out period indicating the completion of the cycle of operations. Any of the above-described techniques for enabling the head-end control unit and its corresponding computer-like device to detect the end of a cycle of operations or any number of equivalent techniques known to those skilled in the art may be employed without departing from the scope of the present invention.

Figure 2:
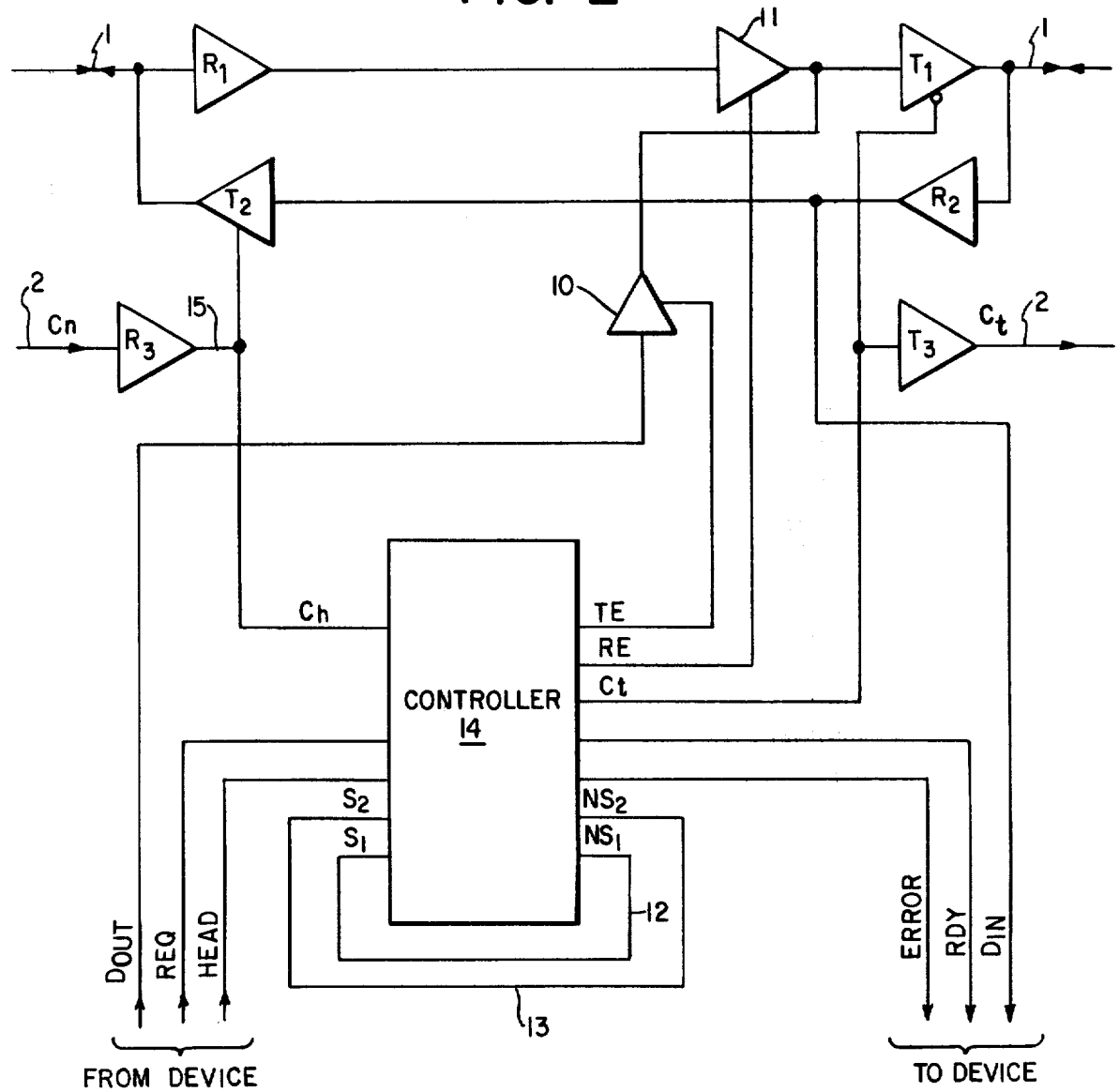
FIG. 2 is a more detailed block diagram of one of the control units shown in FIG. 1.

FIG. 2 illustrates, in block form, the circuitry included in each of the control units $CU_0$ through $CU_N$ of the present invention. Each control unit includes a head side data receiver ($R_1$), a head side data transmitter ($T_2$), a tail side data receiver ($R_2$), a tail side data transmitter ($T_1$), a control signal receiver ($R_3$), and a control signal transmitter ($T_3$). $R_1$ receives and amplifies data signals travelling in a head-tail direction on a portion of data signal path 1 connecting $R_1$ with that control unit which is next closest to the head-end of the bus. $T_2$ is arranged to transmit data signals in a tail-to-head direction on the same portion of data signal path 1 which is connected to $R_1$. $R_2$ receives and amplifies data signals travelling in a tail-to-head direction on a portion of data signal path 1 which connects $R_2$ to that control unit which is next closest to the tail end of the bus. $T_1$ is arranged to transmit data signals in a head-to-tail direction on the same portion of data signal path 1 which is connected to $R_2$. $R_3$ receives the incoming control signal ($C_h$) from a portion of control signal path 2 connecting $R_3$ to the above-mentioned control unit which is next closest to the head-end of the bus. It will be noted that the output of $R_3$ is connected to $T_2$ for enabling $T_2$ to transmit upon the reception by $R_3$ of the active state of the control signal. $T_3$ is arranged to transmit the outgoing control signal ($C_t$) to a portion of control signal path 2 connecting $T_3$ to the above-mentioned control unit which is next nearest to the tail-end of the bus.

Communications with the device associated with the control unit and overall sequencing of operations within the control unit is obtained by means of a controller 14. In the presently preferred implementation of the invention, controller 14 is a PROM module such as the 82S123 of Signetics Corporation (see Signetics Data Manual, Memories pp. 29–35, Signetics, Corp. 1976). Such a PROM has the capability of receiving a plurality of input signals and generating a plurality of output signals responsive to the input signals. A preselected data pattern may be "burned into" the PROM module by known means so that for any given combination of input signals a corresponding unique combination of output signals is defined. It will be appreciated that a number of alternative implementations of controller 14 are possible without departing from the scope of the invention. For example, controller 14 could comprise a suitable network of digital logic circuits or an appropriately programmed mini-computer.

In the present implementation, controller 14 is capable of receiving five input signals: the previously discussed $C_h$, REQ, and HEAD signals; and two state signals ($S_1$ and $S_2$). In response to each combination of these input signals, controller 14 generates the appopriate combination of the following output signals: the previously discussed RDY and $C_t$ signals, a transmit enable (TE) signal, a receive enable (RE) signal, an ERROR signal, and two next state signals ($NS_1$ and $NS_2$). It will be noted that lines 12 and 13 convey the $NS_1$ and $NS_2$ signals to the input signal side of controller 14 where they are seen respectively as the $S_1$ and $S_2$ signals. The reason for these connections will be discussed in a subsequent portion of the specification.

As previously stated, a preselected data pattern may be burned into the PROM module comprising controller 14 in the present implementation. This data pattern defines the output signal which will be generated by controller 14 in response to any given combination of input signals. The data pattern may be defined by the following Boolean equations wherein the right side of each equation defines all of the combinations of state of input signals which will cause the activation of the output signal of the left side of that equation.

$$NS_2 = REQ\ (\overline{HEAD}\ (S_2 + S_1 \cdot C_h) + HEAD) \quad (1)$$

$$NS_1 = REQ \cdot \overline{HEAD}\ (\overline{S_2} \cdot \overline{C_h} + \overline{S_2} \cdot S_1) \quad (2)$$

$$RDY = S_2 \cdot \overline{S_1} \cdot REQ \quad (3)$$

$$TE = S_2 \cdot \overline{S_1} \cdot REQ \quad (4)$$

$$RE = \overline{S_2} + S_1 + \overline{REQ} \quad (5)$$

$$C_t = \overline{HEAD} \cdot C_h[(\overline{REQ} + \overline{S_2} \cdot \overline{S_1})] + HEAD\ (\overline{REQ} + \overline{S_2}) \quad (6)$$

$$ERROR = \overline{HEAD}\ (\overline{REQ} \cdot S_1 + S_2 \cdot \overline{S_1} \cdot \overline{REQ} \cdot \overline{C_h}) \quad (7)$$

The corresponding device of the head-end control unit always holds the HEAD signal in its activated state whereas the corresponding devices of the other control units always hold the corresponding HEAD signals in their inactive states. Assuming a controller which is included in a control unit other than the head-end control unit, the above equations may be simplified as follows:

$$NS_2 = REQ\ (S_2 + S_1 \cdot C_h) \quad (8)$$

$$NS_1 = REQ \cdot \overline{S_2}(\overline{C_h} + S_1) \quad (9)$$

$$RDY = S_2 \cdot \overline{S_1} \cdot REQ \quad (10)$$

$$TE = \overline{S_2} \cdot \overline{S_1} \cdot \overline{REQ} \quad (11)$$

$$RE = \overline{S_2} + S_1 = \overline{REQ} \quad (12)$$

$$C_t = C_h(\overline{REQ} + \overline{S_2} \cdot \overline{S_1}) \quad (13)$$

$$ERROR = \overline{REQ} \cdot S_1 + S_2 \cdot \overline{S_1} \cdot \overline{REQ} \cdot \overline{C_h}$$

In such a controller four operation states (defined by the $S_1$ and $S_2$ signals) are possible: an idle state wherein $S_2$ and $S_1$ are both inactive; a wait state wherein $S_2$ is inactive and $S_1$ is active; a transition state wherein $S_2$ and $S_1$ are both active; and a transmit state wherein $S_2$ is active and $S_1$ is inactive. The $NS_2$ and $NS_1$ signals are conveyed back to the input signal side of the controller so as to comprise, after a short delay, the input signals $S_2$ and $S_1$, respectively. Any change in the states of the five input signals which results in a change to the state of the $NS_2$, or $NS_1$ or both signals will, consequently, result in a change of the operational state of the controller 14 as defined by $S_2$ and $S_1$.

Assuming the controller 14 to be in the idle state ($S_2$ and $S_1$ both inactive), it will be noted that equation (8) cannot be satisfied and equation (9) may be satisfied only when the REQ signal is activated (indicating that the corresponding computer-like device has data to transmit) before controller 14 receives the active incoming control signal ($C_h$) via $R_3$. Under these latter conditions the controller 14 enters the wait state wherein it waits to receive the active incoming control signal ($C_h$). Upon reception of $C_h$ equation (8) is satisfied and $NS_2$ is activated, thereby causing the controller 14 to enter the transition state. The activation of the $NS_2$ signal results in the activation of the $S_2$ signal after a short propagation delay. With $S_2$ active, equation (9) is no longer satisfied which results in the deactivation of the $NS_1$ signal thereby causing $S_1$ to again be deactivated. The above sequence of operations results in a situation in which $S_2$ is active and $S_1$ is inactive which, as previously mentioned, is defined as the transmit state of the controller 14. While controller 14 is in this state, the control unit transmits data from its corresponding device to the other control units on the bus via data signal path 1. Upon completion of this data transmission, the device deactivates the REQ signal which results in the deactivation of the $NS_2$ signal in accordance with equation (8). The deactivation of $NS_2$ results in the deactivation of $S_2$ which returns the controller to the idle state.

The foregoing discussion described all of the normal operational state changes which are possible in the controller 14. It is possible, however, for certain other changes to take place under abnormal conditions. The occurence of one of these abnormal operational state changes causes controller 14 to activate the ERROR signal which is transmitted to the corresponding device. It is anticipated that such a device will include means for taking corrective measures upon recognition of the ERROR signal.

Equation (14) defines the two conditions under which the controller 14 of the present invention will activate the ERROR signal. The first such condition occurs if the REQ signal becomes inactive while the $S_1$ signal is active. Such a condition could occur, for example, if while controller 14 was in either the wait state or the transition state, the device deactivated the previously active REQ signal. It is therefore required that the device, after activating the REQ signal, hold that signal in its active state until controller 14 reaches the transmit state.

The second situation in which the ERROR signal is activated occurs if the controller is in the transmit state ($S_2$ active, $S_1$ inactive) and the incoming control signal ($C_h$) becomes inactive before the device deactivates the REQ signal. Such a situation could be caused, for example, by a circuit failure in a control unit positioned closer to the head-end of the bus than that control unit which was currently transmitting data.

It will be noted that controller 14, upon the occurrence of either of the above abnormal conditions, will in addition to activating the ERROR signal, also return to the idle state in accordance with equations (8) and (9).

The following discussion describes the sequence of operations which occur within a head-end control unit such as $CU_O$ for initiating a cycle of operations on the communications bus. Reference to FIG. 3 which illustrates the timing of the operations within a head-end control unit will be useful in gaining an understanding of these operations.

As previously discussed, the device associated with a head-end control unit always holds the HEAD signal in its active state. The controller equations (1) through (7) may, therefore, be reduced as follows:

$$NS_2 = REQ \quad (15)$$

$$NS_1 = 0 \quad (16)$$

$$RDY = S_2 \cdot REQ \quad (17)$$

$$TE = S_2 \cdot REQ \quad (18)$$

$$RE = \overline{S_2} + \overline{REQ} \quad (19)$$

$$C_t = \overline{S_2} + \overline{REQ} \quad (20)$$

ERROR=0      (21)

It will be noted from equation (16) above that the $NS_1$ and consequently the $S_1$ signals are always inactive in such a head-end control unit. Thus, the only two operational states possible for a head-end control unit are the previously discussed idle and transmit states.

FIG. 3 illustrates the operation of the head-end control unit being at a time $t_1$, at which time the control unit is in the idle state. At this time all of the output signals of controller 14 are inactive except for the RE signal and the outgoing control signal ($C_t$) which are active in accordance with equations (19) and (20), respectively. Under these conditions any data signals travelling on data signal path 1 in a tail-to-head direction pass through data receiver $R_2$ of FIG. 2 and are thence conveyed to the corresponding device via the $D_{in}$ signal path. At a time $t_2$ at which the device detects that all previous operations on the bus have been terminated by means such as those previously discussed, the device activates the REQ signal which results in the activation by the controller 14 of the $NS_2$ signal in accordance with equation (15). After a small propagation delay, the $S_1$ input signal to controller 14 becomes active. The activation of the $S_1$ signal causes controller 14 to activate the RDY signal and the TE signal in accordance with equations (17) and (18) respectively, and to deactivate the RE signal and the $C_t$ signal in accordance with equations (19) and (20), respectively. It will be noted from FIG. 2 that the inactive state of the RE signal conditions $T_1$ to transmit data in a head-to-tail direction, and that the active state of the TE signal conditions a three-state buffering device 10 to transmit data presented to it by the device via the $D_{OUT}$ signal path.

The inactive state of the outgoing control signal $C_t$ is presented to control signal path 2 by $T_3$, thereby signaling the other control units on the bus to accept data travelling in a head-to-tail direction on data signal path 1. The active RDY signal is presented to the device which upon reception of this signal waits until a time $t_4$ at which time it may either commence to transmit data to the controller via the $D_{OUT}$ signal path or deactivate the REQ signal. If the device does transmit data, the deactivation of the REQ signal is delayed until the termination of this data transmission at a time $t_5$, as illustrated by FIG. 3. During the data transmission the data signals on the $D_{OUT}$ signal path are transmitted through the three-state buffering device 10, and $T_1$ so as to be transmitted on data signal path 1 in a head-to-tail direction. The deactivation of the REQ signal at the termination of this data transmission at $t_5$ returns the control until to its original state wherein it is prepared to read data travelling in a tail-to-head direction on data signal path 1.

The following discussion will describe the operations which take place within a non-head-end control unit such as $CU_1$ for reading data from and transmitting data to other devices on the communications bus. Reference to FIG. 4, which illustrates the timing of operations within such a non-head-end control unit, will be useful in gaining an understanding of these operations.

In the operational example illustrated by FIG. 4 it will be seen that the controller 14 of the control unit is in the idle state at a time $t_7$. At this time the incoming control signal ($C_h$) is not yet active, and all of the output signals of controller 14 are inactive except for the RE signal which is active in accordance with equation (12) since both the $S_2$ and REQ signals are inactive. Referring to FIG. 2, it will be seen that $T_2$ is prevented from transmitting by the inactive state of the $C_h$ signal which is received from the control signal path 2 by $R_3$ and presented to $T_2$ via signal path 15. It will also be seen that $T_1$ is enabled to transmit by the inactive state of the $C_t$ signal from controller 14 and that a three-state buffering device 11 is also enabled to transmit by the active state of the RE signal from controller 14. Under these conditions data signals travelling in a head-to-tail direction on data signal path 1 are received by $R_1$ and transmitted to the next portion of data signal path 1 in a head-to-tail direction via three-state buffering device 11 and $T_1$. The data signals from $T_1$ also pass through $R_2$ and are presented to the device via the $D_{IN}$ signal path. These data signals are also presented to $T_2$ but are not transmitted further by $T_2$ since, as previously mentioned, $T_2$ is deconditioned by the inactive state of the $C_h$ signal.

Referring again to FIG. 3, at a time $t_8$ at which device determines that it has data to transmit, it activates the REQ signal which results in the activation of the $NS_1$ signal by controller 14 in accordance with equation (9). The activation of the $NS_1$ signal results in the activation of the input signal $S_1$ to controller 14 at a time $t_9$. Thus, starting at $t_9$ controller 14 is in the previously discussed wait state wherein it awaits the activation of the $C_h$ signal before proceeding further. In the present example, the active $C_h$ signal is received by $R_3$ at a time $t_{10}$ and presented to controller 14 which activates the $NS_2$ signal in accordance with equation (8). At $t_{11}$ the $S_2$ input signal to controller 14 becomes active and the controller enters the previously discussed transition state. Controller 14 remains in this state only momentarily, because the activation of the $S_2$ signal causes the deactivation of the $NS_1$ signal in accordance with equation (2). The $S_1$ input signal to controller 14 in turn becomes inactive at time $t_{12}$ and controller 14 thus enters the transmit state. It will be noted that the deactivation of $S_1$ and $t_{12}$ causes the activation of the RDY and TE signals in accordance with equations (10) and (11) respectively, and the deactivation of the RE signal in accordance with equation (12).

Referring again to FIG. 2, it will be seen that $T_2$ is conditioned to transmit by the active state of the $C_h$ signal, $T_1$ is conditioned to transmit by the inactive state of the $C_t$ signal, three-state buffering device 10 is conditioned to transmit by the active state of the TE signal, and three-state buffering device 11 is prevented from transmitting by the inactive state of the RE signal. The RDY signal is passed to the device via the RDY signal path and the device responds by commencing to transmit data signals to the control unit via the $D_{OUT}$ signal path. These data signals are transmitted through three-state buffering device 10 and $T_1$ and are thereby transmitted on data signal path 1 in a head-to-tail direction. The data signals also pass through $R_2$ and are transmitted by $T_2$ to data signal path 1 in a tail-to-head direction.

At a time $t_{13}$ at which the data transmission is complete, the device deactivates the REQ signal. The deactivation of the REQ signal causes controller 14 to deactivate the $NS_2$, RDY, and TE signals in accordance with equations (8), (10), and (11), respectively, and to activate the RE and $C_t$ signals in accordance with equations (12) and (14), respectively. Upon the consequent deactivation of the $S_2$ signal at time $t_{14}$, controller 14 is again in the idle state. This idle state differs from the idle state of $t_7$, however, in that the $C_t$ and $C_h$ signals are now in their active rather than inactive states.

Referring again to FIG. 2, it will be seen that under the above conditions $T_2$ is conditioned to transmit by the active state of the $C_h$ signal as received by $R_3$, $T_1$ is deconditioned from transmitting by the active state of the $C_t$ signal, three-state buffering device 11 is conditioned to transmit by the active state of the RE signal, and three-state buffering device 10 is deconditioned from transmitting by the inactive state of the TE signal. At this point, data signals travelling in a tail-to-head direction on data signal path 1 are received by $R_2$ and presented to the device via the $D_{IN}$ signal path. These data signals are also presented to and are transmitted by $T_2$ so that they continue travelling on data signal path 1 in a tail-to-head direction. The controller remains in this state wherein it may receive data transmissions from control units lying closer to the tail-end of the bus until the completion of the current cycle of operations is signalled by the deactivation of the $C_h$ signal at a time $t_{15}$. The deactivation of the $C_h$ signal in turn causes controller 14 to deactivate the $C_t$ signal in accordance with equation (13). At this point the control unit is in an idle state similar to that of $t_7$ wherein it may receive data transmissions from control units lying closer to the head-end of the bus. It will be noted that if at the time the $C_h$ signal is next activated ($t_{16}$), the associated device has not requested a data transmission by activating the REQ signal, the only action of controller 14 is that of activating the $C_t$ signal in accordance with equation (13). Under these conditions, the controller is again in an idle state similar to that of $t_{14}$.

What is claimed is:

1. A data communication system comprising:
    a plurality of control units each one of which includes means for transmitting and receiving data;
    a communication bus, having a head end and a tail end, interconnecting said control units in series and including a bidirectional data signal path and a single unidirectional control signal path;
    a plurality of devices each one of which is adapted for either or both transmitting or receiving data;
    an interface signal bus corresponding to each one of said devices operatively connecting each corresponding device to a corresponding one of said control units;
    wherein at least one of said control units includes means for activating a control signal and unidirectionally propagating said control signal toward the tail end of said communications bus via said control signal path; and wherein
    each of said control units includes selectable means for unidirectionally propagating said control signal toward the tail end of said communications bus via said control signal path, and means responsive to the active state of said control signal and independent of any other signal on said communications bus for enabling its corresponding device to transmit data.

2. A system in accordance with claim 1 wherein the one of said control units which is connected closest to the head end of said communications bus includes said control signal activating means.

3. The system of claim 1 wherein each of said devices corresponding to a one of said control units having said control signal activating means includes:
    means for transmitting a HEAD signal via the corresponding interface bus for enabling said control signal activating means.

4. The system according to claims 2 or 3, further comprising:
    means in each of said devices responsive to the presence of data ready for transmission from said device for activating a request signal through said corresponding interface bus to the corresponding control unit for causing said control unit to initiate a transfer of said data to the other ones of said control units via said data signal path.

5. The system of claim 4 wherein each of said devices corresponding to the ones of said control units having control signal activating means further includes:
    means for sensing the completion of a cycle of data transfer operations on said communications bus; and
    means responsive to the absence of data ready for transmission for deactivating said request signal; and
    wherein said corresponding control unit further includes means responsive to the deactivation of said request signal for activating said control signal.

6. Apparatus in accordance with claim 5 wherein said means for propagating said control signal comprises:
    a control signal receiver for receiving said control signal from the one of said control units which is next closest to said head end of said communication bus via said control signal path;
    a control signal transmitter, operatively connected to said control signal receiver, for transmitting said control signal to the one of said control units which is next closest to said tail end of said communication bus via said control signal path; and
    a transmitter disabler responsive to said request signal for disabling said control signal transmitter.

7. The system in accordance with claim 6 wherein each one of said control units further comprises:
    a head side data receiver for receiving data signals via said data signal path from the ones of said control units which are closer to said head end;
    a tail side data receiver for receiving data signals via said data signal path from the ones of said control units which are closer to said head end;
    a selectable tail side data transmitter operatively connected to said head side data receiver and said corresponding device for transmitting data signals to the ones of said control units which are closer to said tail end via said data signal path;
    a selectable head side data transmitter operatively connected to said tail side data receiver and said device for transmitting data signals to the ones of said control units which are closer to said head end via said data signal path; and
    a controller responsive to the active state of said control signal for selecting said head side data transmitter and responsive to the inactive state of said request signal for selecting said tail side data transmitter.

8. The system of claim 7 further comprising:
    an outgoing data signal path in each of said interface busses connecting said corresponding device to said head side data transmitter and said tail side data transmitter for transmitting outgoing data signals from said device;
    said controller being responsive to the coincidence of said request signal and the active state of said control signal for selecting both said head side data transmitter and said tail side data transmitter.

9. The system of claim 8 further comprising:

an incoming data signal path in each of said interface busses connecting said corresponding device to said head side data receiver and said tail side data receiver for receiving data signals from other ones of said control units.

10. The system according to claim 9 wherein said controller comprises an electronic logic network for receiving said HEAD signal, said request signal (REQ), an incoming control signal ($C_h$), an $S_1$ signal and an $S_2$ signal, and for generating a $NS_2$ signal, a $NS_1$ signal, a ready (RDY) signal, a transmit enable (TE) signal, a receive enable (RE) signal, an outgoing control signal ($C_t$) and an ERROR signal in accordance with the following Boolean logic equations:

$$NS_2 = REQ(\overline{HEAD}(S_2 + S_1 \cdot C_h) + HEAD) \quad (1)$$

$$NS_1 = REQ \cdot \overline{HEAD}(\overline{S_2} \cdot \overline{C_h} + \overline{S_2} \cdot S_1) \quad (2)$$

$$RDY = S_2 \cdot \overline{S_1} \cdot REQ \quad (3)$$

$$TE = S_2 \cdot \overline{S_1} \cdot REQ \quad (4)$$

$$RE = \overline{S_2} + S_1 + \overline{REQ} \quad (5)$$

$$C_t = \overline{HEAD} \cdot C_h (\overline{REQ} + \overline{S_2} \cdot \overline{S_1}) + HEAD \cdot (\overline{REQ} + \overline{S_2}) \quad (6)$$

$$ERROR = \overline{HEAD}(REQ \cdot S_1 + S_2 \cdot \overline{S_1} \cdot REQ \cdot \overline{C_h}). \quad (7)$$

* * * * *